United States Patent

[11] 3,599,403

[72] Inventor  Marion A. Gantz
              1937 High St., Cuyahoga Falls, Ohio 44221
[21] Appl. No. 55,039
[22] Filed     July 15, 1970
[45] Patented  Aug. 17, 1971

[54] DUAL-PATH MOWER VEHICLE
     9 Claims, 7 Drawing Figs.
[52] U.S. Cl. .................................................. 56/10.4,
                        56/6, 56/11.9, 56/13.5, 56/15.5
[51] Int. Cl. .................................................. A01d 35/26
[50] Field of Search ......................................... 56/6, 10.4,
                        13.6, 11.9, 15.5, DIG. 15

[56]              References Cited
              UNITED STATES PATENTS
3,115,739  12/1963  Thoen et al. .................  56/6
3,045,413  7/1962   Sheffer .......................  56/6 X Primary Examiner—Louis G. Mancene
Assistant Examiner—J. N. Eskovitz
Attorney—Hamilton, Cook, Renner & Kenner ABSTRACT: A vehicle carrying dual-path mowing heads for cutting vegetation primarily from both sides of continuous or discontinuous obstructions such as fences, posts, highway guard rails and the like. Two rotary mower blades are mounted within rotatable housings which absorb the impact encountered by said posts and the like to minimize deflection. The housings swing at right angles to each other as they depend from a horizontal boom extruding outward from the vehicle, the housings being positioned with respect to each other by hydraulic cylinders or other power device. The boom is pivotally mounted to the vehicle so that the mower blades can be raised and retracted for storage, transportation or avoidance of an obstacle. The length of the boom is also adjustable so that areas more remote from the vehicle can be readily reached. All of the adjustments and controls are completely operable from within the cab of the vehicle.

PATENTED AUG 17 1971

INVENTOR.
MARION A. GANTZ
BY Hamilton, Cook,
Renner & Kenner
ATTORNEYS

DUAL-PATH MOWER VEHICLE

BACKGROUND OF THE INVENTION

This invention relates to a mowing vehicle capable of cutting the vegetation along two paths, as for example, simultaneously on both sides of an obstacle such as a fence or highway guard rail. More particularly, this invention relates to a mowing vehicle which is totally automatic and adjustable so that minimal uncut vegetation remains near the obstruction.

Landowners and highway maintenance departments have long been plagued with the problem of mowing the vegetation or grass adjacent to, underneath, and on both sides of obstructions such as guard rails, fences, signposts, trees, reflectors and the like. Standard procedures require two passes, one along each side of the obstruction, to mow the majority of the vegetation. Even two passes with standard gang-type mowers, however, does not adequately eliminate the grass near the obstruction. In the case of highway maintenance, for example, this necessitates the use of followup crews of men who mow the remaining grass by hand. Of course, both the double pass and manual followup procedures can be particularly dangerous to these workmen along a highway.

As a solution, dual path mowers, particularly as attachments to standard tractors, have been developed. In general, these attachments extend outward from the tractor and have two mower blades, one mower blade being placed on each side of the obstruction so that as the tractor moves along parallel to the obstruction, both sides thereof are mowed. While such devices have enjoyed some degree of success, all those of which I am aware have certain operational deficiencies or disadvantages.

For example, one such device utilizes a horizontal bar extending from the lower portion of a tractor to carry a mower blade for cutting the near side of an obstruction, with the far side being mowed by a blade carried on a stanchion depending from an overhead boom. The boom is usually supported near the top of the tractor and through a winchlike system, is capable of raising or lowering the blade.

Another tractor attachment mower device eliminates the horizontal bar and depends both cutting blades from the overhead or horizontal boom. Both of these blades are vertically movable along a track mounted on the side of the tractor.

In both of the aforementioned devices, the mowing heads carrying the blades are spring biased directly toward each other in an attempt to minimize the uncut area as posts and the like are encountered therebetween. However, it has been found that for any degree of efficient operation, these devices must be operated on intolerably low speeds. This is due to the fact that when the spring-biased heads contact a post or other obstruction they tend to bounce away from each other; and by the time they return to their normally tangent position, an unnecessarily large area of vegetation remains around the post. Of course, the faster the tractor moves, the larger the deflection of the blades and the larger the uncut area.

Another problem attendant to and precipitated by the speed of the vehicle is that of damage to the obstruction or to the mower heads themselves. With mower heads of the prior art, unless one mowed at extremely low speeds, such damage would occur. In an attempt to minimize this, a rotatable bumper coated with rubber was provided. However, this was found insufficient due to the fact that the mower heads being spring biased as hereinabove described, would still hit the obstruction and bounce away therefrom, therefore not taking advantage of the rotatable bumper. Attempts to eliminate these problems by providing larger springs not only increased the damage to the obstructions and equipment, but also often made separation of the mower heads more difficult, particularly when large obstructions were encountered.

These devices have a further disadvantage in that they are effective only when used in conjunction with continuous obstructions due to the fact that the vertical arm which cuts the far side of the obstruction (away from the tractor) must be manually lifted or swung out over the obstruction before use. When the obstructions encountered are discontinuous, as particularly is the case along many highways, the operator must continually stop the vehicle and "rethread" the obstruction between the blades.

Thus, the known attachments are not capable of being completely operable from the tractor. This is, of course, because only vertical adjustments have been provided. Heretofore, horizontal or lateral adjustments of the blades have been impractical primarily for the reason of tractor stability. Being attachments to a standard tractor, it is nearly impossible to extend the blades laterally away from the tractor to reach more distant obstructions without tipping tractor or making the tractor extremely difficult to control. Of course, owing close to and around obstructions requires a high degree of accuracy and driver control.

Finally, it has been found that prior devices which utilized winches, pulleys, belts, links and like mechanical elements are extremely difficult and expensive to maintain, particularly due to the continual movement along an uneven roadside with the additional jarring as the obstructions are encountered.

SUMMARY OF THE INVENTION

It is, therefore, a primary object of the present invention to provide a dual path mower vehicle capable of cutting substantially all of the necessity on both sides of an underneath an obstruction.

It is another object of the present invention to provide a vehicle, as above, which operates the dual path mower fully automatically without the necessity of "rethreading" the mowing heads around the obstruction.

It is still another object of the present invention to provide a vehicle, as above, capable of raising, lowering, separating, and extending the dual path mowers.

It is yet another object of the present invention to provide a vehicle, as above, which is capable of mowing at higher speeds without damaging the obstruction or the mowing heads.

It is further object of the present invention to provide a vehicle, as above, in which the dual mowers separate at an angle of 90° from each other thereby more efficiently mowing the vegetation around an obstruction.

It is a still further object of the present invention to provide a vehicle, as above, which is integrally connected to the dual path mowers and therefore more stable than the attachment-type devices.

It is yet a further object of the present invention to provide a vehicle, as above, which is free short-life mechanical parts such as belts, ropes, links, springs, and the like.

These and other objects which will become apparent from the following specification are accomplished by structures hereinafter described and claimed.

In general, a vehicle is provided with a horizontal boom extending outwardly from the top thereof, the length of which is adjustable. The outer end of the boom supports two vertically oriented arms which carry, at their lower ends, two mowing heads normally tangent to each other and in contact with the ground. The inner end of the boom is pivotally mounted so that the vertical arms may be arcuately raised and lowered. Further, the arms themselves are adjustably separable at 90° to each other, as by hydraulic cylinders.

Each mowing head consists of a rotary blade driven by a hydraulic motor. Each blade is housed beneath a rigid plate which carries rotatable bearing members. Extending around the blade and rotatably mounted on the bearing members is a C-shaped track member which is coated with a resilient material. When the track members constant an obstruction, rather than deflect from each other at an angle of 180°, they glide or ride thereover on the bearing members at an angle of 90° to each other, having a component of movement in a direction opposite to the direction of movement of the vehicle.

BRIEF DESCRIPTION THE DRAWINGS

DESCRIPTION OF THE PREFERRED EMBODIMENT

Figure 1:
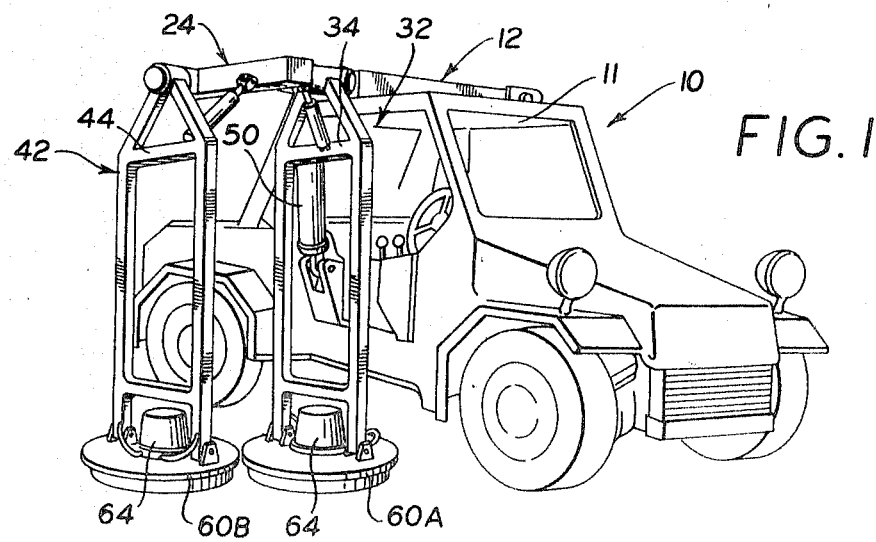
FIG. 1 is a perspective view of a dual path mowing vehicle according to the concept of the present invention.

A dual path mowing vehicle according to the concept of the present invention is indicated generally by the numeral 10 in FIG. 1. While the exact shape and construction of vehicle 10 is unimportant to the present invention, it is important that the vehicle be of sufficient structural strength to carry the mowing structures to be hereinafter described. Further, it is necessary that the vehicle have both "on-the-road" and "off-the-road" capabilities and the attendant heavy duty suspension system so that obstructions along a roadway as well as those in fields and the like may be adequately cleared of vegetation.

It is preferable that the vehicle 10 be provided with a substantially flat top 11 for carrying a horizontal boom 12 thereon. Boom 12 is connected at its inner end to journal plates 13 which are carried by a heavy duty axle 14 rotatably journaled to trunnions 15. The trunnions 15 can be attached to top 11 as by bolts 16.

The horizontal boom 12 consists of an outer tubelike member 18 attached at its inner end to the journal plates 13 as described above. Slidably received within tube 18 and extending through the outer end thereof is a hollow arm 19. Traversing the arm 19 is a crosspiece 20 having a clevis bracket 21 fixed thereto. A hydraulic cylinder 22 is attached to the inner end of tube 18 and includes a piston rod 23 which is fixed to clevis 21. Actuation of the cylinder 22 therefore controls the position of the inner arm 19 with respect to tube 18.

Figure 2:
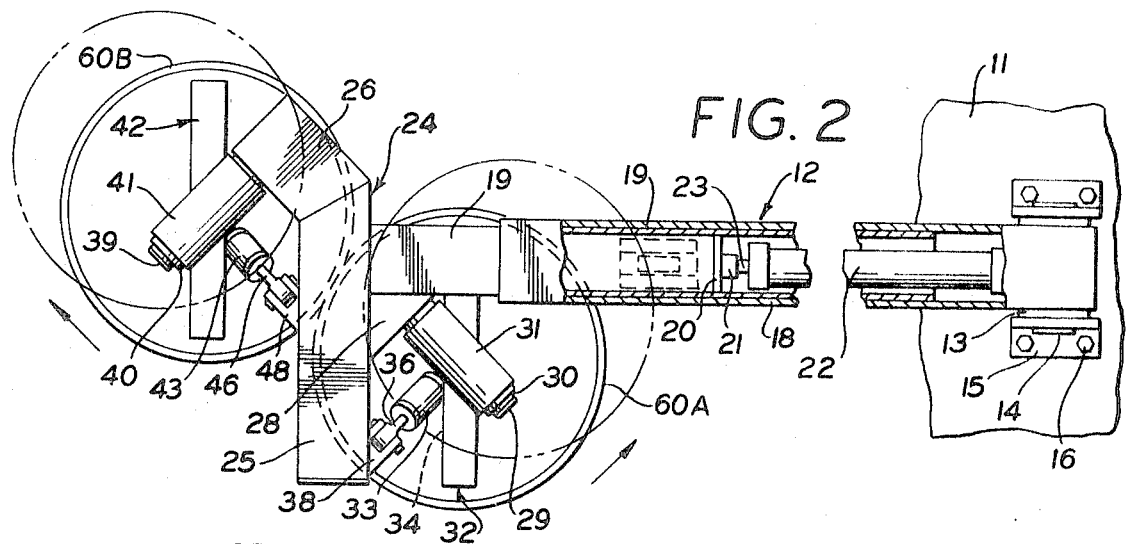
FIG. 2 is a partially sectioned partially broken away plan view of the vehicle according to the present invention showing the mowing heads in two positions.

Arm 19 extends outwardly through tube 18 and is affixed to a bifurcated beam 24 having a long branch 25 and a short branch 26 angular thereto. A gusset plate 28 is mounted between arm 19 and branch 25 and has, extending outwardly at right angles therefrom, an axle member 29 which is substantially parallel to the longitudinal direction of the short branch 26 of beam 24. Axle 29 rotatably carries, on a bearing surface 30, a cylindrical sleeve 31. Welded or otherwise affixed to sleeve 31 is a first or inner mower head carrying mast 32. Inner mast 32 is therefore arcuately swingable on axle 29 in a direction shown by the arrow in FIG. 2 being powered by a cylinder 33 angularly connected to a crossbar 34 of mast 32 as by swivel connection 35. A piston rod 36 of cylinder 33 is fixed to a swivel bracket 38 mounted on branch 25 of beam 24. Actuation of cylinder 33 causes the inner mast 32 to swing in the direction of the arrow, as to the chain line position, in FIG. 2.

Extending outwardly at substantially right angles to branch 26 of beam 24 is axle member 39, the axis of which therefore being oriented in a direction approximately 90° to that of axle 29. Axle 39 rotatably carries, on a bearing surface 40, a cylindrical sleeve 41. Welded or otherwise affixed to sleeve 41 is a second or outer mower head carrying mast 42. Outer mast is therefore arcuately swingable on axle 39 in a direction shown by the arrow in FIG. 2 being powered by a cylinder 43 angularly connected to a crossbar 44 of mast 42 as by swivel connection 45. A piston rod 46 of cylinder 43 is fixed to a swivel bracket 48 mounted on branch 25 of beam 24. Actuation of cylinder 43 causes the outer mast 42 to swing in the direction of the arrow, as to the chain line position, in FIG. 2.

Figure 3:
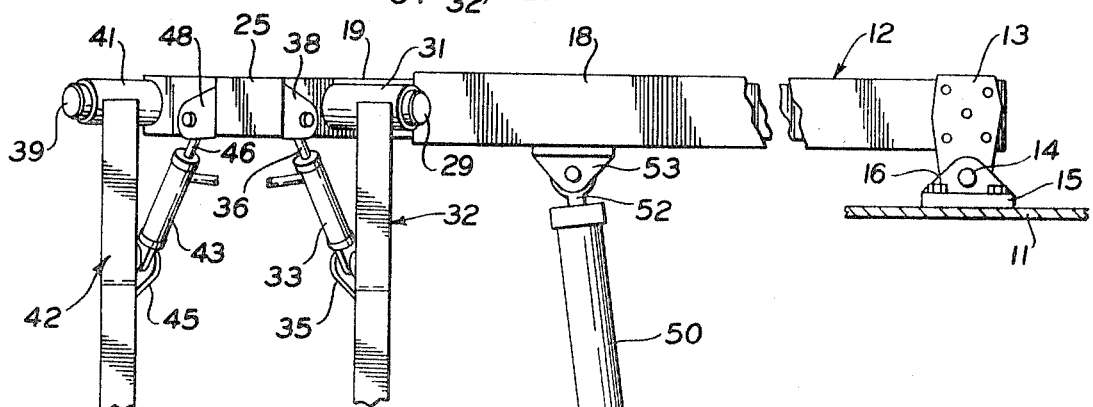
FIG. 3 is a partially sectioned partially broken away side view of substantially the portion of the vehicle according to the present invention shown in FIG. 2.

Thus, it should be evident that the boom 12 through arm 19 carries the inner and outer masts 32 and 42, respectively, which masts can be moved horizontally by cylinder 22 and arcuately by cylinders 33 and 43, respectively. Boom 12 and the members carried thereby are also movable about axle 14 by a hydraulic cylinder 50 which is affixed to a swivel bracket 51 attached to the side of vehicle 10 and has a piston rod 52 mounted on the swivel bracket 53 attached to the bottom of tube 18. It is therefore apparent that actuation of cylinder 50 causes boom 12 and masts 32 and 42 to be lifted in a clockwise direction (as seen in FIG. 3) around axle 14.

Figure 4:
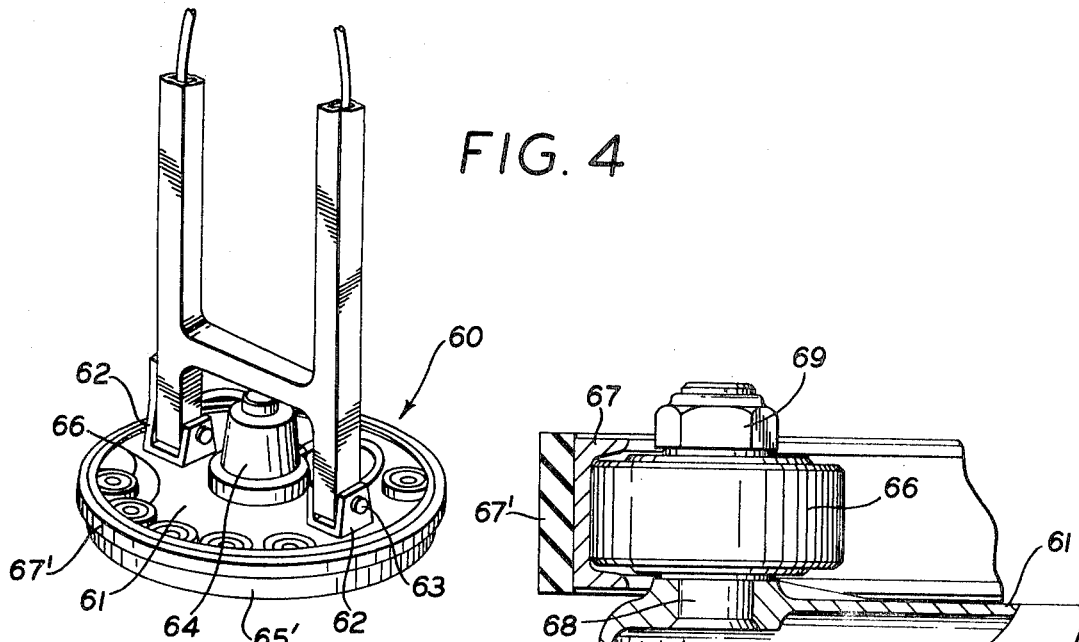
FIG. 4 is a perspective view of a mowing head according to the concept of the present invention.
Figure 5:
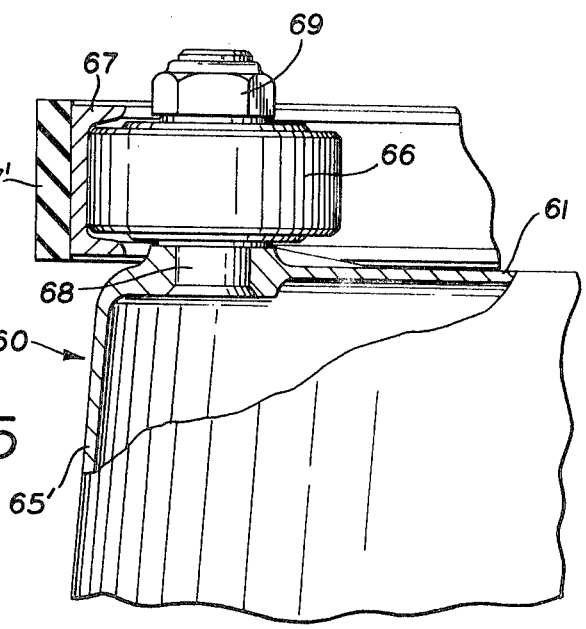
FIG. 5 is a partially sectioned partially broken away view of a portion of the mowing head according to the concept of the present invention.

Each mast 32 and 42 carries at its lower end identical mowing heads indicated generally by the numeral 60 in FIG. 4. Each mowing head 60 consists of a generally circular top plate 61 upon which is mounted two U-shaed brackets 62 which attach the heads 60 to the lower end of the masts 32 and 42, as by pins 63. The head 60 may be slightly rotatable on pins 63 or the attachment may be rigid, as desired.

Figure 7:
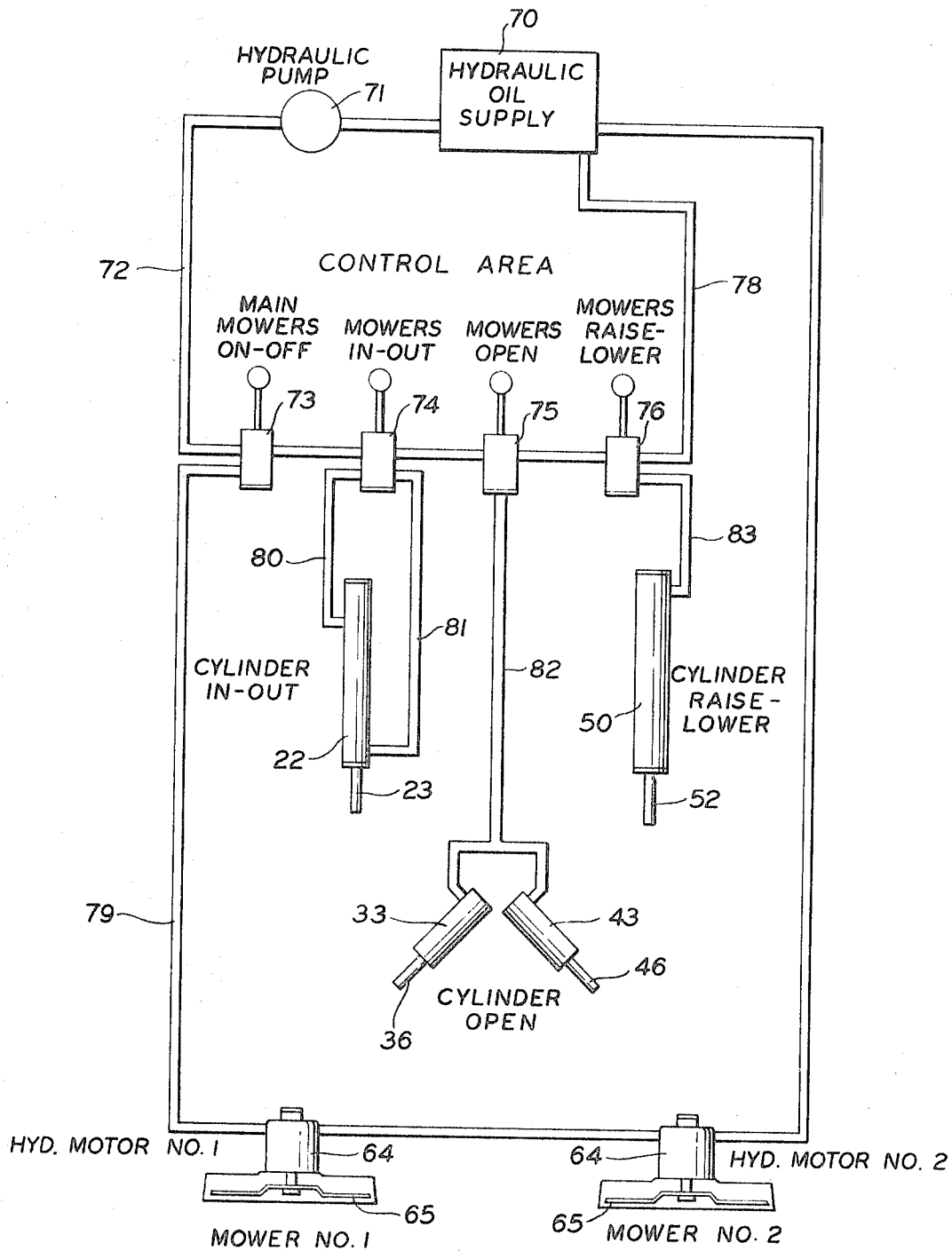
FIG. 7 is a schematic diagram for the controls according to the concept of the present invention.

Mounted centrally on each plate 61 is a hydraulic motor 64 which operates the rotary blade 65 (FIG. 7). Each blade 65 is guarded by an annular skirt 65' which can be an integral extension of plate 61.

Mounted near the perimeter of each plate 61 is a plurality of bearing means or rollers 66 which are journaled on vertically extending circumferentially spaced axles 68 and held thereon as by nuts 69. While the exact number of rollers 66 for each mowing head 60 is unimportant, it is necessary that enough be provided so that a circular C-shaed track 67 may readily ride thereon. The peripheral portion of track 67 is provided with a resilient bumper 67' to aid in absorbing blows encountered as the mowing head 60 strikes an obstruction.

Figure 6:
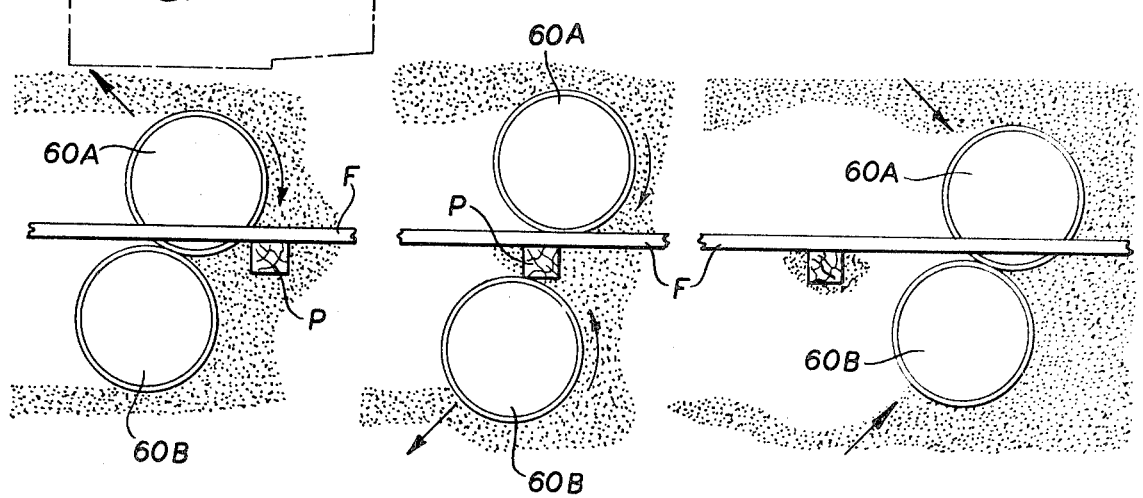
FIG. 6 is a sequential view depicting the mowing action of the mowing heads around a support post of an obstruction and underneath the obstruction.

Diagrammatically shown in FIG. 6 are the two mower heads 60A and 60B sequentially depicted clearing the vegetation from beneath a fence F and around post P, the vehicle 10 moving to the right as indicated by the arrow. In the first view of the left in FIG. 6, head 60A (carried by inner mast 32) is just making contact with he post P. At such time head 60A will tend to me in the direction of the arrow having a component of movement in a direction opposite to the movement of he vehicle 10. The tendency to rotate on axle 29 will, however, be minimized by the rotation of track 67 on rollers 66. Further, bumper 67' will absorb some of the shock not only minimizing the deflection of head 60A but also protecting the post P and head 60A from damage.

The center view in FIG. 6 indicates that point in time just after head 60B has contacted post P. Deflection, as outer mast 42 rotates on axle 39, in the direction of the arrow with a component in a direction opposite to the movement of the vehicle is again minimized by the rotatable track 67 having bumper 67'. The view on the right of FIG. 6 shows the mowing heads 60A and 60B back at their normally tangent position the post P having been substantially cleared of vegetation.

It should be evident that the mowing sequence shown in FIG. 6 can be performed at much higher speeds than available in the prior art not only because of the sliding arrangement of the track 67 on rollers 66, but also because the heads 60A and 60B are not biased toward each other but rather swingable along arcs 90° from each other. In the prior art, the mowing heads were biased directly toward each other and deflectable directly away from each other, thus causing a larger area of uncleared vegetation and the necessity of moving at lower speeds.

The hydraulic circuitry which operates the motors 64 and cylinders 22, 33, 43, and 50 is shown schematically in FIG. 7. An oil or other fluid supply 70 is moved, as by pump 71, through feed line 72 through a plurality of control levers 73, 74, 75, and 76 which are parallel to each other, each receiving its fluid from supply 70 through line 72. If all controls are off, the fluid is passed through a bypass or return line 78 to the supply 70.

Control lever 73 regulates the motors 64 and if actuated fluid will flow in line 79 operating the mower blades 65. Control lever 74 regulates the fluid in lines 80 and 81 to control cylinder 22. If lever 74 is placed in the "mower out" position, fluid is introduced in line 80 to extend rod 23 of cylinder 22. In such an instance, the arm 19 which carries the masts 32 and 42 is extended outward away from the vehicle. Movement of lever 74 to the "mower in" position regulates the fluid in line 81 moving piston rod 23 inward and therefore retracting the masts 32 and 42 inwardly.

Actuation of control lever 75 causes fluid to pressurize line 82 to actuate cylinders 33 and 43 extending rods 36 and 46 to swingly separate the masts 32 and 42. Reverse movement of lever 75 allows the rods 36 and 46 to slowly retract under the influence of gravity.

Lever 76 controls the fluid pressure in line 83 regulating hydraulic cylinder 50 to extend rod 52 to raise or lower boom 12 above pivot 14. Like lever 75, reverse movement of lever 76 permits the piston rod 52 to retract under the influence of gravity to lower the boom 12 and thus lower the mowing heads 60 into contact with the ground.

It should therefore be evident that a dual path mowing vehicle constructed according to the foregoing description will be completely operable by the driver from his seat in the cab. For example, when it is desired to store or transfer the vehicle over the road without cutting, the masts 32 and 42 may be raised by actuation of cylinder 50 through control lever 76 and retracted by introduction of fluid pressure into line 81 through lever 74. On the other hand, when mowing, complete versatility is afforded in that objects somewhat removed from vehicle 10 can be mowed by the extension of boom 12 by cylinder 22, objects on higher or lower ground can be reached through the control of cylinder 50, and discontinuous objects can be automatically threaded between masts 32 and 42 by actuation of cylinders 33 and 43 through control levers 75.

I claim:

1. A vehicle for mowing vegetation in a dual path on both sides of an obstruction comprising, a normally horizontal boom mounted on the vehicle and extending outwardly from the vehicle, two normally vertical masts swingable depending from said boom on axes oriented 90° of each other, normally tangent mowing heads carried at the lower end of each said mast and each including a mowing blade, and means to power each said blade so that the vegetation on both sides of an obstruction can be cleared with said mower heads moving around the obstruction by rotation of said masts in planes 90° of each other.

2. A vehicle, according to claim 1, including means to separate said masts to place the obstruction therebetween.

3. A vehicle, according to claim 1, wherein said boom is laterally extendible and including means to laterally extend said boom to reach vegetation remote from the vehicle.

4. A vehicle, according to claim 1, wherein said boom is rotatably mounted on said vehicle and including means to rotate said boom to retract said masts for storage and transportation.

5. A vehicle, according to claim 1, wherein each said mowing head includes circumferentially spaced upwardly extending axle members upon which bearing means are journaled, and track means which ride on said bearing means at the outer peripheral portion of each said mowing head so that said track means is rotatable with respect to said mowing head when said mowing head makes contact with an obstruction.

6. A vehicle, according to claim 5, wherein the radially outer end of said track means is coated with a resilient material to protect said mowing head and the obstruction from damage.

7. A vehicle for mowing vegetation in a dual path on both sides of an obstruction comprising, a normally horizontal and laterally extendible boom rotatably mounted on the vehicle, two normally vertical masts swingably depending from said boom, normally tangent mowing heads carried at the lower end of each said mast and each including a mowing blade, means to laterally extend said boom to reach vegetation remote from the vehicle, means to rotate said boom to retract said masts for storage and transportation, means to separate said masts to place the obstruction therebetween, and means to power each said blade to mow the vegetation on both sides of the obstruction.

8. A vehicle, according to claim 7, wherein each said mowing had includes circumferentially spaced upwardly extending axle members upon which bearing means are journaled, and track means riding on said bearing means at the peripheral portion of each said mowing head so that said track means can rotate with respect to said mowing head when said mowing head contacts an obstruction.

9. A vehicle, according to claim 8, wherein the radially outer portion of said track means is coated with a resilient material to protect each said mowing head and the obstruction from damage.